United States Patent [19]
Tiernan et al.

[11] Patent Number: 6,118,786
[45] Date of Patent: Sep. 12, 2000

[54] APPARATUS AND METHOD FOR MULTIPLEXING WITH SMALL BUFFER DEPTH

[75] Inventors: James C. Tiernan, Solano Beach; Maha Achour, San Diego, both of Calif.

[73] Assignee: Tiernan Communications, Inc., San Diego, Calif.

[21] Appl. No.: 09/145,118

[22] Filed: Sep. 2, 1998

Related U.S. Application Data

[63] Continuation of application No. 08/944,902, Oct. 6, 1997.
[60] Provisional application No. 60/028,010, Oct. 8, 1996, and provisional application No. 60/031,168, Nov. 19, 1996.

[51] Int. Cl.[7] .................................................. H04J 3/02
[52] U.S. Cl. .......................................... 370/416; 370/538
[58] Field of Search ................................... 370/412, 413, 370/414, 415, 416, 417, 418, 395, 535, 537, 538; 395/877

[56] References Cited

U.S. PATENT DOCUMENTS

| | | | |
|---|---|---|---|
| 5,319,707 | 6/1994 | Wasilewski et al. | 380/13 |
| 5,400,401 | 3/1995 | Wasilewski et al. | 380/9 |
| 5,420,866 | 5/1995 | Wasilewski et al. | 370/110.1 |
| 5,521,927 | 5/1996 | Kim et al. | 370/94.2 |
| 5,541,919 | 7/1996 | Yong et al. | 370/416 |
| 5,859,980 | 1/1999 | Kalkunte | 370/253 |
| 5,914,962 | 6/1999 | Fimoff et al. | 370/538 |

FOREIGN PATENT DOCUMENTS

WO 95/23495  9/1995  WIPO.

OTHER PUBLICATIONS

Tiernan, J.C., and Wechselberger, T., "Description of a Universal Packet Multiplex Transport for the Transmission for Broadcast Applications of Digital Services, including Video, Audio, and Data Programs," Technical Proposal, International Organization for Standardization Organization Internationale de Normalization, pp. 1–14 (Jan. 9, 1993).

"Implementation Guidelines for the Use of MPEG-2 Systems, Video and Audio in Satellite and Cable Broadcasting Applications in Europe, DVB–TS (Geneva)" pp. 1–14 (Jun., 1994).

"Guidelines on Implementation and Usage of Service Information," TM1324 Rev. 1, Final Draft, pp. 1–30 (Mar. 17, 1995).

"Digital Broadcasting Systems for Television, Sound and Data Services; Specification for Serive Information (SI) in Digital Video Broadcasting (DVB) Systems," European Telecommunication Standard, prETS 300 468, pp. 1–62 (Oct., 1994).

"Information Technology—Generic Coding of Moving Pictures and Associated Audio: Systems Recommendation H.222.0," ISO/IEC 13818–1, International Organization for Standardization Organization Internationale de Normalization, pp. 1–146 (Nov. 13, 1994).

"Transmultiplexing, Transcontrol and Transscrambling of MPEG–2/DVB Signal," O.W. Bungam, International Broadcasting Convention, Sep. 12–16, 1996 pp. 288–293.

(List continued on next page.)

*Primary Examiner*—Huy D. Vu
*Attorney, Agent, or Firm*—Hamilton, Brook, Smith, & Reynolds, PC

[57] ABSTRACT

An optimal multiplexing method is disclosed which allows buffers to be two packets in depth. For a plurality of buffers, with each buffer associated with a packetized data stream, packets are received at respective buffer input rates. The buffers are serviced at a service rate at least equal to a sum of the buffer input rates. For each buffer, once a full packet has been received therein, a time interval until that buffer is expected to reach its buffer depth is determined. The buffer having the least time interval is then serviced first, such that overflow of the buffers is avoided.

12 Claims, 5 Drawing Sheets

OTHER PUBLICATIONS

"Der MPEG–2–Standard Generische Codierung Für Bewegtbilder und zugehöriger Audio–Information," Fernseh Und Kinotechnik, vol. 48(10), pp. 545–553 Oct. 1, 1994.

"Hardware Implementation of the Transport Stream Demultiplexer for the $^H$DTV$_T$ Demonstrator," Stammnitz et al; Signal Processing of HDTV, VI, 435–441 (1995).

"MPEG–2: A Tutorial Introduction to the Systems Layer," P. Sargersei IEE Apr. 1–Apr. 13, Jan. 1, 1995.

CL Liu & JW Layland, Scheduling Algorithms for Multiprocessing in a Hard–Real–Time Environment, Journal of the Association for Computing Machinery, vol. 20 No.1 Jan. 1973, pp. 46–61.

APPARATUS AND METHOD FOR MULTIPLEXING WITH SMALL BUFFER DEPTH

RELATED APPLICATIONS

This application is a continuation of U.S. patent application Ser. No. 08/944,902 filed Oct. 6, 1997, which claims priority to U.S. Provisional Application No. 60/028,010, filed Oct. 8, 1996 and to U.S. Provisional Application No. 60/031,168, filed Nov. 19, 1996, each of which is incorporated herein by reference in its entirety.

BACKGROUND OF THE INVENTION

The International Organization for Standardization (ISO) has adopted a standard (ISO/IEC 13818-1) that addresses the combining of one or more "elementary streams" of video and audio, as well as other data, into single or multiple streams suitable for storage or transmission. The ISO/IEC 13818-1 standard, hereinafter referred to as the "MPEG-2 Systems" standard, is described in detail in the ISO draft document "Generic Coding of Moving Pictures and Associated Audio", ISO/IEC JTC1/SC29/WG11 N0801 (Nov. 13, 1994), which is incorporated herein in its entirety by reference.

The MPEG-2 Systems standard defines an individual coded video, audio or other coded bitstream as an "elementary stream". The contents of an elementary stream may be broken into a sequence of discrete units, in which case the elementary stream is structured as a Packetized Elementary Stream (PES). The individual units, or packets, are known as PES packets, which can be of large and variable size. The MPEG-2 Systems standard defines generic structures for PES packet formats and specifies particular rules for creating PESs from digital video and audio elementary streams.

The MPEG-2 Systems standard defines two methods of creating a multiplex of PESs. In a Program Stream (PS), all components in the multiplex are assumed to belong to a single "Program", that is, a collection of elementary streams which may sensibly be presented as a unity to a user, all components being referenced to a common time base, together with certain coordinating control information. PES packets from component PESs are multiplexed by PES packet.

In a Transport Stream (TS), the components of the multiplex may belong to many programs. Each PES is assigned a "packet identifier" (PID). A sequence of packets identified by the same value of the PID field represents a single service component, typically a video or an audio component, or a user data component. The PES packets are broken into small, fixed-size units called transport packets, which may be multiplexed with transport packets from other PESs. The Transport Stream is transmitted at a constant rate, the transport rate, which is sufficient to accommodate the bandwidth requirements of all components carried within the Transport Stream. Coordination and control of the PESs and the Programs in the TS is managed via control data called Program Specific Information (PSI) that is structured as a set of service control tables.

Thus, a Transport Stream can be understood as a multiplex of service components combined with descriptive service control information. However, the MPEG-2 Systems standard does not define how the Transport Stream multiplex is to be formed.

SUMMARY OF THE INVENTION

It is known that the delay introduced by a multiplexing system increases when buffer sizes or depth increases. Therefore, a multiplexing method that introduces minimum delay is desirable.

According to the present invention, an optimal multiplexing method is provided which allows buffers to be two packets in depth. Accordingly, for a plurality of buffers, each buffer associated with a packetized input data stream and having a buffer depth, packets are received at respective buffer input rates. The packetized input data streams are, for example, MPEG transport streams. The buffers are serviced at a service rate at least equal to a sum of the buffer input rates to provide an output data stream. At least one null packet is sent until at least one of the buffers has received a full packet. For each buffer, once a full packet has been received therein, a time interval until that buffer is expected to reach its buffer depth is determined. The buffer having the least time interval is then serviced first, such that overflow of the buffers is avoided. If more than one buffer has the least time interval, then that buffer having the fastest buffer input rate is serviced first.

While the preferred embodiments are described with reference to MPEG-2 Systems standard Transport Streams, the principles of the present invention are intended to encompass the multiplexing of any data streams that comprise fixed length packets and have a self-contained directory structure which describes the multiplex. Thus, while the term "transport stream" is used herein to denote a Transport Stream as defined by the MPEG-2 Systems standard, the principles of the present invention are also applicable to systems using similar transport structures such as Asynchronous Transfer Mode (ATM) systems.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views.

DETAILED DESCRIPTION OF THE INVENTION

Figure 1A:
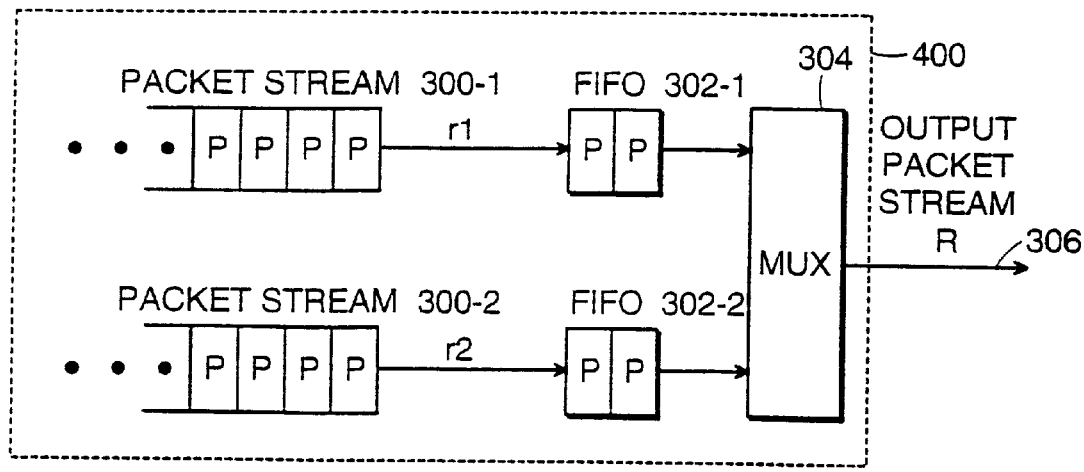
FIG. 1A is a schematic block diagram of a two-stream packet multiplexing apparatus in accordance with the present invention.

Referring to FIG. 1A, a two-stream packet multiplexing apparatus 400 is shown which illustrates the principles of the present invention. The multiplexing apparatus 400 includes three elements: a pair of first-in, first-out (FIFO) buffers 302-1, 302-2 and a multiplexer 304. Each FIFO buffer 302-1, 302-2 receives an input packet stream 300-1, 300-2, respectively comprising packets P. The multiplexer 304 multiplexes the two input packet streams to provide an output packet stream 306.

As described further herein below, one of the input streams 300-1, 300-2 may be, for example, generated by a local encoder while the other may be an output transport stream from a separate multiplexer.

It can be shown, as described herein below, that, if the sum of the input rates of the packet streams 300-1, 300-2 does not exceed the data rate of the output packet stream 306 generated by the output multiplexer 304, then the depth of each of the FIFOs 302-1, 302-2 can be made as small as two packets. If these conditions are met on average, but the sum of the input data rates may, on a burst basis, exceed the output data rate, then larger FIFOs will be needed in order to ensure that no transport packets are lost. The maximum FIFO depth is dependent on the maximum burst size in this instance.

Figure 1B:
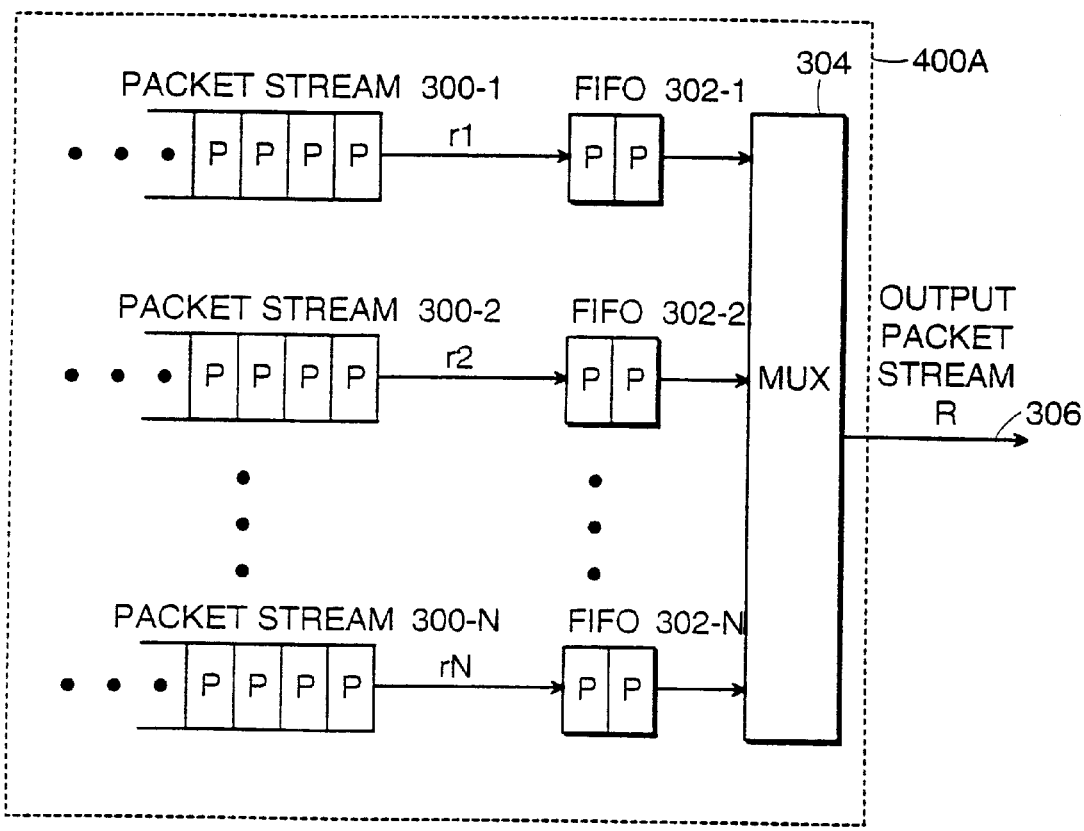
FIG. 1B is a schematic block diagram of an N-stream packet multiplexing apparatus in accordance with the present invention.

The present invention provides a multiplexing method that is optimal because it requires minimum size buffers of two packets and, therefore, introduces minimum delay. In general, the optimal multiplexing method of the present invention can be applied to any multiplexing system with N-input packetized data streams of packet size P. Accordingly, as shown in FIG. 1B, an N-stream packet multiplexing apparatus 400A provides an N:1 multiplex of input packet streams 300-1, 300-2, . . . , 300-N. The multiplexing apparatus 400A receives packets of input packet streams 300-1, 300-2, . . . , 300-N into respective FIFOs 302-1, 302-2, . . . , 302-N at fixed rates $r_1, r_2, \ldots r_N$. The service rate R at which the multiplexer 304 services the FIFO buffers 302-1, 302-2, . . . , 302-N is such that $$R \geq r_1 + r_2 \ldots + r_N$$

It is helpful to imagine the worst case where there are no gaps between packet arrivals. In this case, bits are being loaded into each of the FIFOs at the constant rates $r_1, r_2, \ldots r_N$ respectively. In this worst case, there exists an optimal service algorithm such that the buffers are of minimum two-packet size. As it is known, the delay introduced by a multiplexing system increases when buffer size increases. Therefore, the optimal service policy introduces the minimum delay. Such a small delay is desirable in an MPEG stream, for example, since it can provide a higher performance at the decoder level.

Starting with size 2 buffers, the present invention provides a service policy wherein at any service time, if none of the buffers has a full packet, a null packet is sent until at least one of the buffers reaches the packet size P or exceeds P. Then, the buffer with the least time left until overflow occurs is serviced first. If more than one buffer has the same minimum time, then the buffer with the fastest input rate is serviced first.

Figure 2:
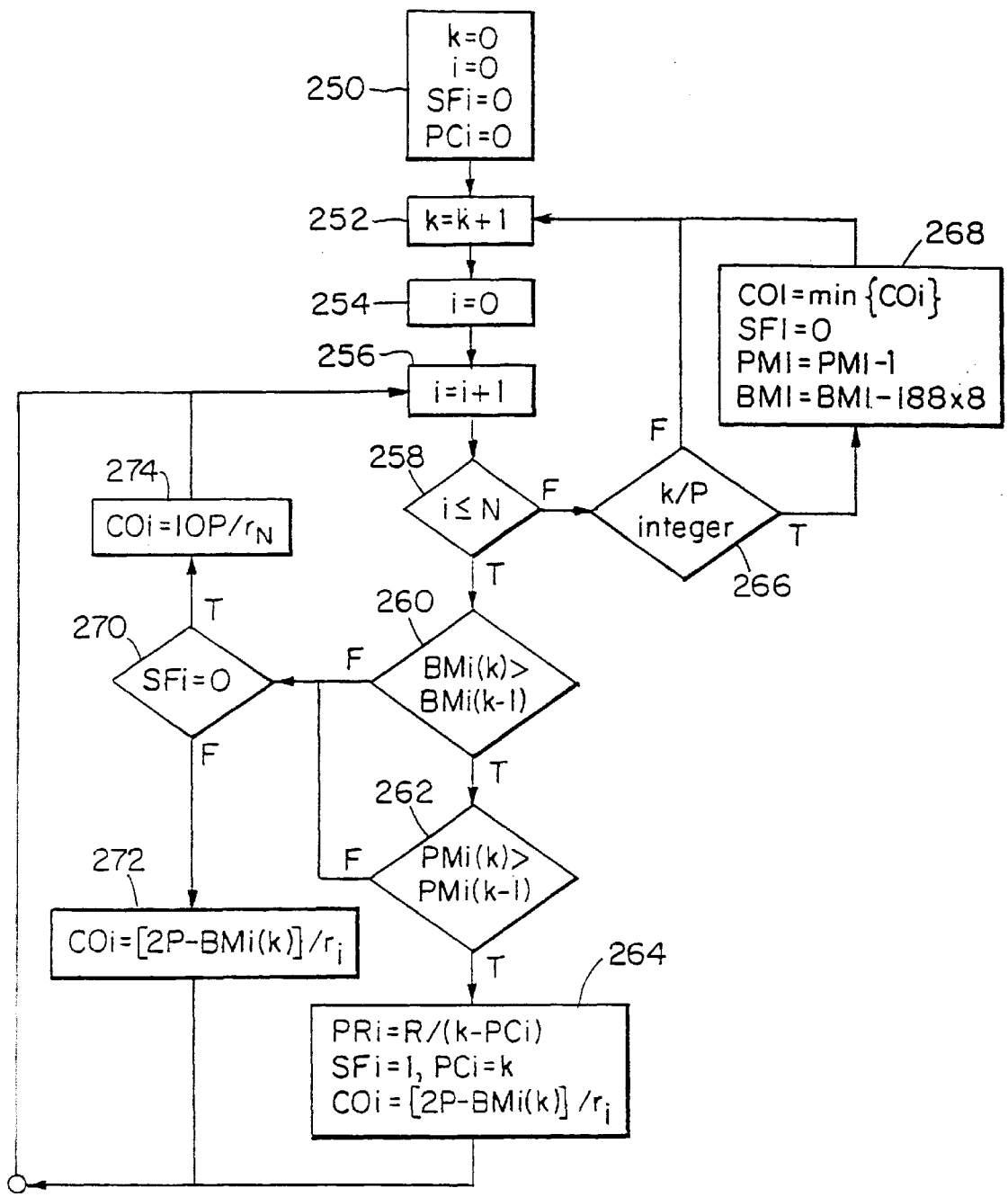
FIG. 2 is a flow diagram of a multiplexing method in accordance with the present invention.

FIG. 2 outlines the steps involved in the optimal service algorithm. In the general case of N input FIFO buffers $B_i$ with respective clock rates $r_i$ (i=1,2 . . . N), the rates are ordered such that $r_1 \geq r_2 \geq \ldots \geq r_{N-1} \geq r_N$. Packets reach the buffer $B_i$ at random intervals, but once a packet reaches the buffer the bits are loaded at the rate $r_i$ without interruption.

The time axis can be digitized to intervals of size 1/R, with the index k referring to the time $t_k$=k/R seconds. Starting with an initial state of buffer meter BMi(0)=0 bits, time is incremented from $t_k$ to $t_{k+1}$, i.e., k→k+1 at steps 250, 252. During the interval $[t_k, t_{k+1}]$ at step 256, the algorithm performs the following functions on each of the N buffers:

The algorithm checks if another bit has been added to the buffer $B_i$ i.e. if BMi (k)>BMi (k−1) at step 260. At step 270, if BMi (k)=BMi (k−1), that is, no new bits are inserted in the $i^{th}$ buffer, the algorithm checks if the buffer can be serviced. If the buffer cannot be serviced, a relatively long time interval is associated with the buffer to ensure that it will not be serviced, for instance, COi, the time left until buffer overflow, is set to COi=10*P/$r_N$ at step 274. If the buffer can be serviced, then the time COi is unchanged because the buffer size BMi (k) is the same as BMi (k−1).

If BMi (k)>BMi (k−1), then the number of full packets is checked at step 262. The algorithm checks if another packet has been added to the buffer $B_i$, i.e., if PMi (k)>PMi (k−1). If PMi (k)=PMi (k−1), i.e., the number of full packets is the same, then the algorithm checks if the buffer could be serviced at step 270. If the buffer cannot be serviced (SFi=0), then the time left until the $B_i$ buffer overflows can be set to COi=10*P/$r_N$ at step 274. If the buffer can be serviced (SFi=1), i.e., the buffer includes at least one full packet, then the algorithm decreases the time left until the $B_i$ buffer overflows by updating the equation COi=(2P−BMi (k))/$r_i$ at step 272. If PMi (k)>PMi (k−1) at step 262, i.e., the number of full packets is increased by one, then, the Packet_Rate_i is computed by evaluating PRi=R/(k−PCi), the Packet_Count_i is updated PCi=k and the time left until the buffer $B_i$ overflows is set as COi=(2P−BMi (k))/$r_i$, and flag SFi=1 is set at step 264.

The buffer with the minimum COi is serviced first. After analyzing all N buffers, the algorithm checks if the time $t_{k+1}$ is a multiple of P/R, i.e., a full packet can be serviced at step 266. If true, the algorithm compares the times COi and services the buffer with the minimum COi that is less than 10*P/$r_N$. If the I buffer is serviced, where I is set to the value of i having the minimum COi, then the Service_Flag_I is reset to zero (SFI=0), the Bits_Meter_I is decreased by P=188×8 bits (BMI=BMI−188×8) and the Packet_Meter_I is decreased by one packet (PMI=PMI−1) at step 268. Note that the value of 188×8 bits relates to the packet size of an MPEG packet. Other values can be selected as appropriate for other packet types.

The preceding method guarantees that PMi=0, 1 if the steps are performed during the interval $[t_k, t_{k+1}]$ of length 1/R seconds. In case the interval 1/R is too small, the optimal service algorithm can be modified to set time intervals of size 8/R, instead of 1/R (8/R is the time it takes to service one byte, and 1/R is the time it takes to service one bit). Therefore, the index k refers to the time $t_k$=k 8/R seconds.

Further, the optimal service algorithm can be applied with P/R time intervals, instead of 1/R or 8/R, and buffers of size 2-packets will not overflow (PMi=0). However, P/R could be very tight to update the FIFO status.

The foregoing terms are summarized in the following table:

| | |
|---|---|
| $r_1, r_2, \ldots r_N$ | Clock rates at which bits of a given packet are loaded into FIFOs 302-1, 302-2, . . . 302-N (bits/s) |
| R | Service clock rate at which bits of a given packet are being extracted from any of the FIFOs 302-1, 302-2, . . . 302-N (bits/s) |
| P | Packet size; MPEG specification is 188 × 8 bits (bits) |

-continued

| | |
|---|---|
| SFi | Service_Flag_i: SFi = 0 implies that $B_i$ cannot be serviced, SFi = 1 implies that $B_i$ has a full packet and can be serviced |
| PCi | Packet_Count_i: Time at which a full packet has been inserted into the $B_i$ buffer (seconds) |
| COi | Count_overflow_i: Time left until overflow occurs in 2-packet size buffer $B_i$ (seconds) |
| BMi (k) | Bits_Meter_i: Size of the $B_i$ FIFO in bits (bits) |
| PMi (k) | Packet_Meter_i: Size of the $B_i$ FIFO in packets (packets), PMi = 0 or 1 |
| PRi | Packet_rate_i: Rate at which packets reach the FIFO $B_i$ (packets/s) |

The present invention may be used to provide a number of system architectures, as will now be described.

Figure 1C:
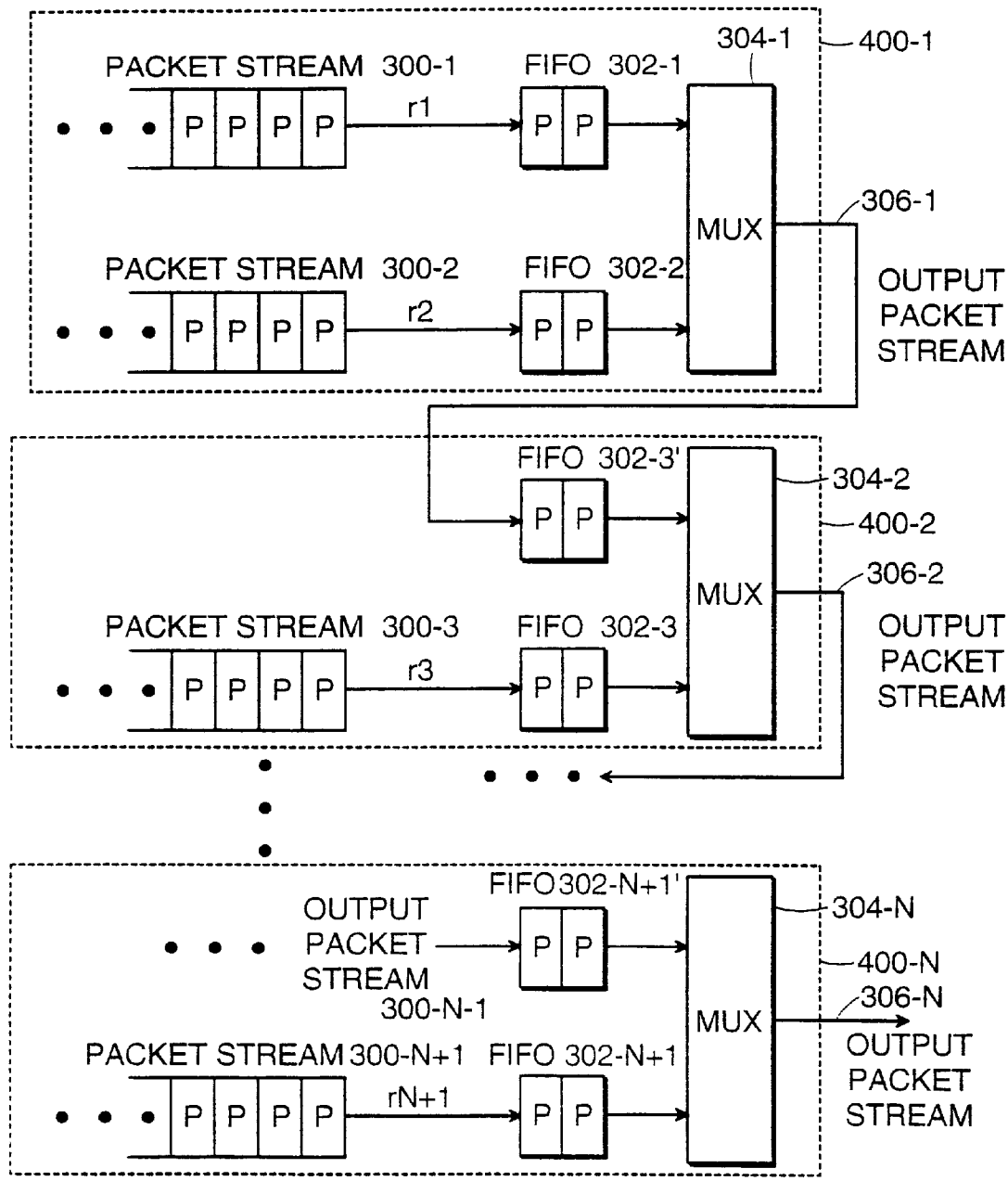
FIG. 1C is a schematic block diagram of an N-series configuration of two-stream packet multiplexers in accordance with the present invention.

An output packet stream containing an arbitrary number of services can be provided by a set of multiplexing apparatus 400-1, 400-2, . . . 400-N connected in series or daisy-chain configuration as shown in FIG. 1C. Each multiplexing apparatus 400-i is a two-stream multiplexing apparatus of the type described above with respect to FIG. 1A. In this configuration, the output packet stream 306-i of each multiplexing apparatus 400-i is provided as an input packet stream of the next. For example, output packet stream 306-1 from multiplexing apparatus 400-1 is provided as an input stream to FIFO 302-3' of multiplexing apparatus 400-2. The output of the last multiplexing apparatus 400-N is the final packet stream 306-N. The number of multiplexing apparatus 400-i which can be so daisy-chained together is limited only by the capacity of the packet stream 400-N and by any physical limitations imposed by interface circuitry.

Figure 3:
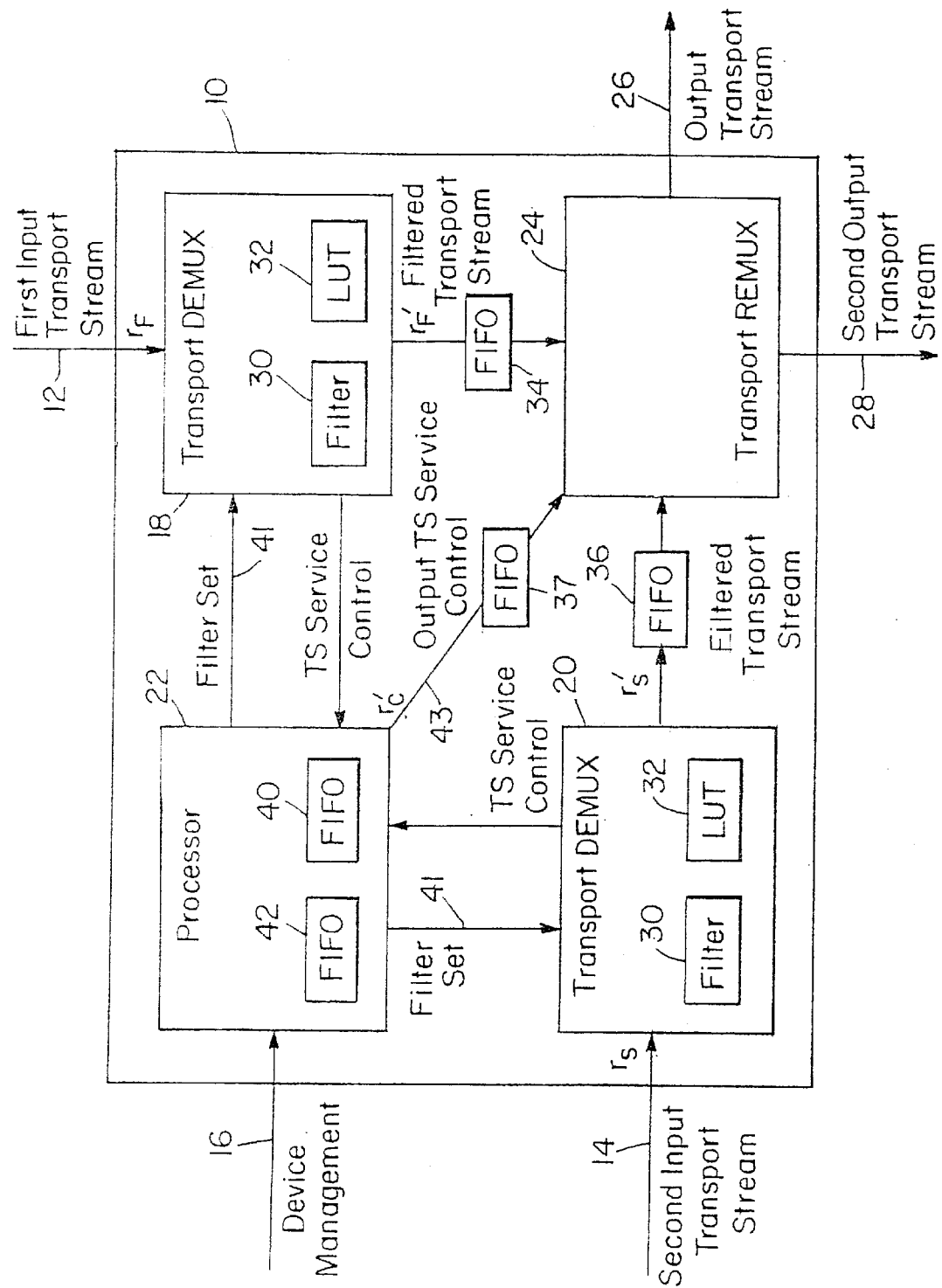
FIG. 3 is a schematic block diagram of an elementary transport multiplexer in accordance with the present invention.

Referring now to FIG. 3, an elementary two-stream MPEG multiplexer 10 which embodies the present invention is shown. The elementary multiplexer 10 receives as input two transport streams on lines 12 and 14, respectively, which have been fully formatted externally to the multiplexer. The multiplexer 10 also receives on line 16 management and control input that is used to configure the multiplexer as described herein below.

The elementary multiplexer 10 comprises four processing elements: a pair of transport demultiplexers 18, 20; a processor 22; and a transport remultiplexer 24. The demultiplexers 18, 20 demultiplex the transport streams to their constituent service components and service control information tables. The service control information tables are routed to the processor 22 which combines and reconfigures the information contained in the tables to provide a single set of output service control information tables. The demultiplexers 18, 20 filter the service components based on the combined and reconfigured information in the service control information tables. The transport remultiplexer 24 multiplexes the output service control information tables with the filtered streams to provide an output transport stream on line 26. A copy of the output transport stream may optionally be made available on line 28.

As noted above, the input transport streams 12, 14 have been fully formatted externally to the multiplexer 10. One of the input streams 12, 14 can be, for example, generated by a local encoder while the other can be an output transport stream from a separate multiplexer. In general, one or more of the PIDs of one input transport stream 12, 14 will conflict with the PIDs in the other input stream 12, 14. To avoid this conflict, the multiplexer 10 preferably re-maps or changes the PIDs for every conflicting packet to a new value that avoids the conflict before it is passed on to the output stream 28. This process is referred to as automatic PID re-mapping. The details of PID re-mapping are provided in the above-referenced co-pending U.S. patent application Ser. No. 08/944,902.

Packets routed to the transport remultiplexer 24 are time stamped and placed in FIFO buffers 34, 36. Packets containing control tables routed to the processor 22 are placed in control FIFOs 40, 42. Processor 22 generates packets to form transport control tables for the output transport stream which are placed in a control FIFO 37. The FIFO buffers 34, 36 and 37 are read by the transport remultiplexer 24 according to the optimal service algorithm described herein above such that FIFOs 34, 36 and 37 each have a packet depth equal to two packets.

The transport remultiplexer 24 reads each transport packet from the FIFOs 34, 36 and 37 and determines how long the packet has been delayed within the multiplexer by reading the multiplexer's time stamp placed onto the packet when it arrived at the input and comparing it to the present time. The Program Clock Reference (PCR) field is adjusted to compensate for this delay if necessary, as specified by MPEG-2, and then the remultiplexer 24 transmits the packet.

In accordance with the present invention, the depth of each of the FIFOs 34, 36 and 37 can be made as small as two transport packets if the sum of the input data rates and the data rate of control packets generated by the processor 22 does not exceed the data rate generated by the output remultiplexer 24.

The multiplexer 10 receives transport packets in the first and second input transport streams at fixed rates $r_F$ and $r_S$ respectively. As noted above, the demultiplexers 18, 20 and processor 22 route transport packets to FIFO buffers 34, 36, 37 respectively. We denote by $r_F'$, $r_S'$ and $r_C'$ the effective input rates for the respective FIFOs 34, 36, 37 such that $$r_F' + r_S' + r_C' \leq r_F + r_S$$

The service rate R at which the transport remultiplexer 24 services the buffers 34, 36, 37 is such that $$R \geq r_F + r_S$$

As noted herein above, the present invention provides a service policy wherein at any service time, if none of the buffers 34, 36, 37 has a full packet, a null packet is sent until at least one of the buffers reaches the packet size P or exceeds P. Then, the buffer with the least time left until overflow occurs is serviced first. If more than one buffer has the same minimum time, then the buffer with the fastest input rate is serviced first.

Figure 4:
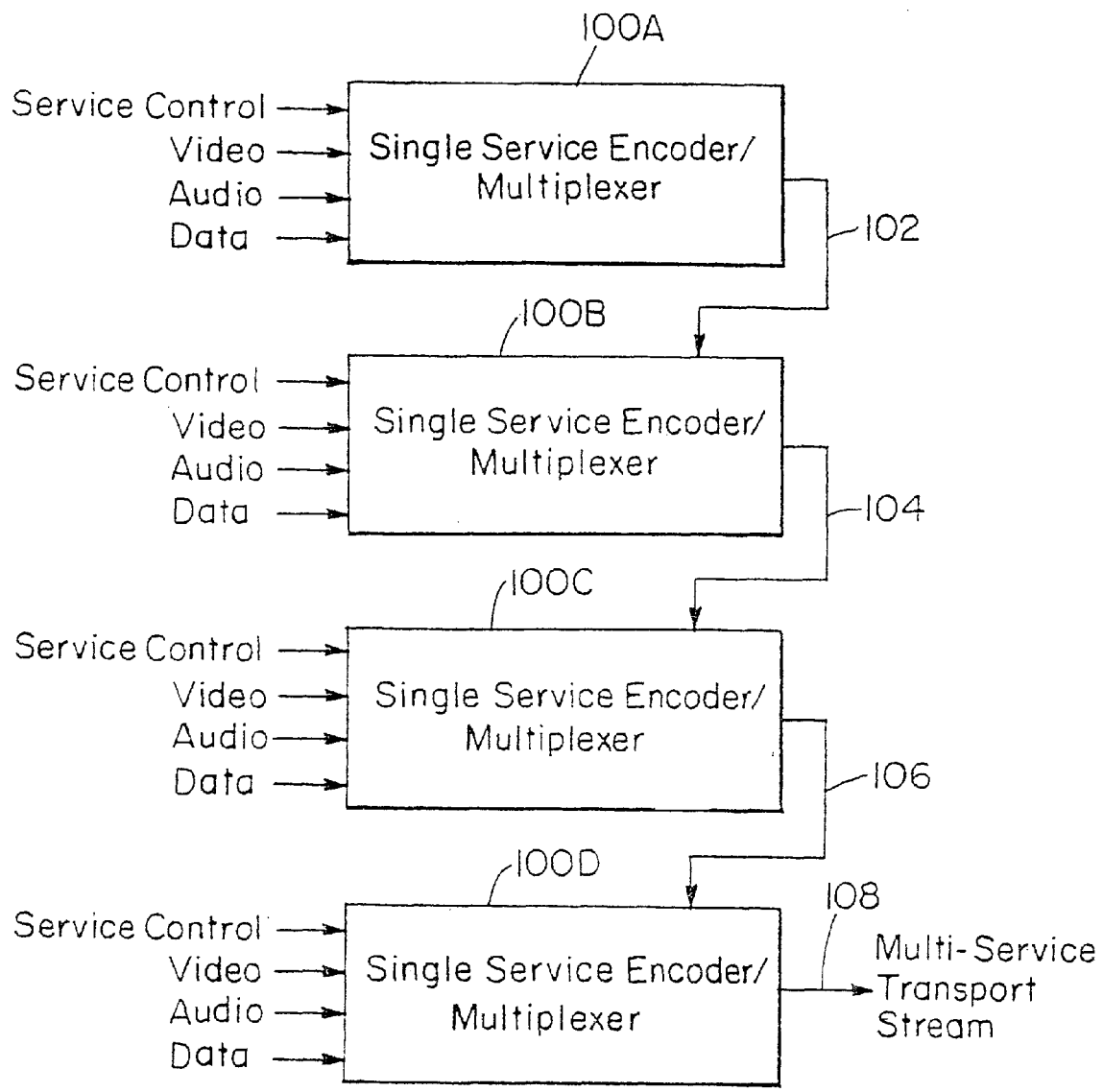
FIG. 4 is a schematic block diagram of a series configuration of single-service encoder/multiplexers in accordance with the invention.

A transport stream containing an arbitrary number of services can be provided by a set of encoder/multiplexers 100A, 100B, 100C, 100D connected in series as shown in FIG. 4. In this embodiment, the encoder/multiplexer 100 incorporates an elementary multiplexer 10 with a single channel encoder that accepts a set of components (e.g., video, audio, data and service control) to be inserted into a transport stream. Further description of the encoder/multiplexer 100 is provided in the above-referenced co-pending U.S. patent application Ser. No. 08/944,902.

In the system embodiment of FIG. 4, the output transport stream of each elementary multiplexer is provided as the input transport stream of the next. No input stream (or a set of null packets) need be provided to the first encoder/multiplexer 100A. The output of the last encoder/multiplexer 100D is the final transport stream 108. The number of encoder/multiplexers 100 which can be so daisy-chained together is limited only by the capacity of the transport stream and by any physical limitations imposed by the interface drivers.

Equivalents

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A method of multiplexing comprising the steps of:

providing a plurality of input data streams, each data stream comprising fixed length packets;

providing a plurality of buffers, each buffer associated with a respective input data stream and having a buffer depth;

receiving packets for each stream in the associated buffer at a respective buffer input rate; and servicing the buffers at a service rate at least equal to a sum of the buffer input rates to provide an output data stream, the servicing step including:

determining for each buffer, once a full packet has been received therein, a time interval until that buffer is expected to reach its buffer depth; and based on time interval, first extracting a packet from that buffer having the least time interval, such that overflow of the buffers is avoided.

2. The method of claim 1 wherein the step of providing buffers includes providing buffers each having a buffer depth of at least two packets.

3. The method of claim 1 wherein the step of providing input data streams includes providing MPEG transport streams.

4. The method of claim 1 wherein the step of providing input data streams includes providing ATM packet streams.

5. The method of claim 1 wherein the servicing step further includes sending at least one null packet in the output data stream until at least one of the buffers has received a full packet.

6. The method of claim 1 wherein for the extracting step, if more than one buffer has the least time interval, then that buffer having the fastest buffer input rate is serviced first.

7. A multiplexing apparatus comprising:

a plurality of input data streams, each data stream comprising fixed length packets;

a plurality of buffers, each buffer coupled to a respective input data stream for receiving packets at an associated buffer input rate, each buffer having a buffer depth; and a multiplexer for servicing the buffers at a service rate at least equal to a sum of the buffer input rates to provide an output data stream, the multiplexer including means for determining for each buffer, once a full packet has been received therein, a time interval until that buffer is expected to reach its buffer depth and means for first extracting, based on time interval, a packet from that buffer having the least time interval, such that overflow of the buffers is avoided.

8. The multiplexing apparatus of claim 7 wherein each buffer has a buffer depth of at least two packets.

9. The multiplexing apparatus of claim 7 wherein the input data streams include MPEG transport streams.

10. The multiplexing apparatus of claim 7 wherein the input data streams include ATM packet streams.

11. The multiplexing apparatus of claim 7 wherein the multiplexer further includes means for sending at least one null packet in the output data stream until at least one of the buffers has received a full packet.

12. The multiplexing apparatus of claim 7 wherein the means for first extracting includes means for first servicing that buffer having the fastest buffer input rate whenever more than one buffer has the least time interval.

* * * * *